United States Patent
Uss et al.

(10) Patent No.: US 11,685,794 B1
(45) Date of Patent: Jun. 27, 2023

(54) METHOD OF INDUSTRIAL EXTRACTION OF ALGINATES FROM BROWN SEAWEED OF THE FAMILY SARGASSACEAE OF THE ORDER FUCALES

(71) Applicants: Iurii Uss, Moscow (RU); Sergey Yudin, Moscow (RU); Denis Turishchev, Moscow (RU)

(72) Inventors: Iurii Uss, Moscow (RU); Sergey Yudin, Moscow (RU); Denis Turishchev, Moscow (RU)

( * ) Notice: Subject to any disclaimer, the term of this patent is extended or adjusted under 35 U.S.C. 154(b) by 0 days.

(21) Appl. No.: 17/670,779

(22) Filed: Feb. 14, 2022

(51) Int. Cl.
*C08B 37/00* (2006.01)

(52) U.S. Cl.
CPC ................................. *C08B 37/0084* (2013.01)

(58) Field of Classification Search
None
See application file for complete search history.

(56) References Cited

U.S. PATENT DOCUMENTS

2010/0298262 A1* 11/2010 Basta .................... A61P 3/10
514/54

OTHER PUBLICATIONS

Latifi, Journal of Applied Biotechnology Reports, vol. 2, Issue 2, Spring 2015; 251-255. (Year: 2015).*
Cheng, CN 110684126A, Jan. 2020, machine translation. (Year: 2020).*

* cited by examiner

*Primary Examiner* — Layla D Berry
(74) *Attorney, Agent, or Firm* — Nadya Reingand

(57) ABSTRACT

The invention comprises a method of industrial extraction of alginates from brown seaweeds of the family Sargassaceae of the order Fucales, as well as the product resulting from the method. The method includes the following stages: preparation of raw materials, crushing of the algae, pressure boiling of the algae, mixing the boiled algae with water, purification of the diluted algal mass, extraction of alginic acid, washing of the alginic acid, dehydration of the alginic acid, treatment of the alginic acid with sodium hydrogen carbonate, clarification of resultant sodium alginate solution, precipitation of sodium alginate gel, and drying of the sodium alginate gel.

12 Claims, 1 Drawing Sheet

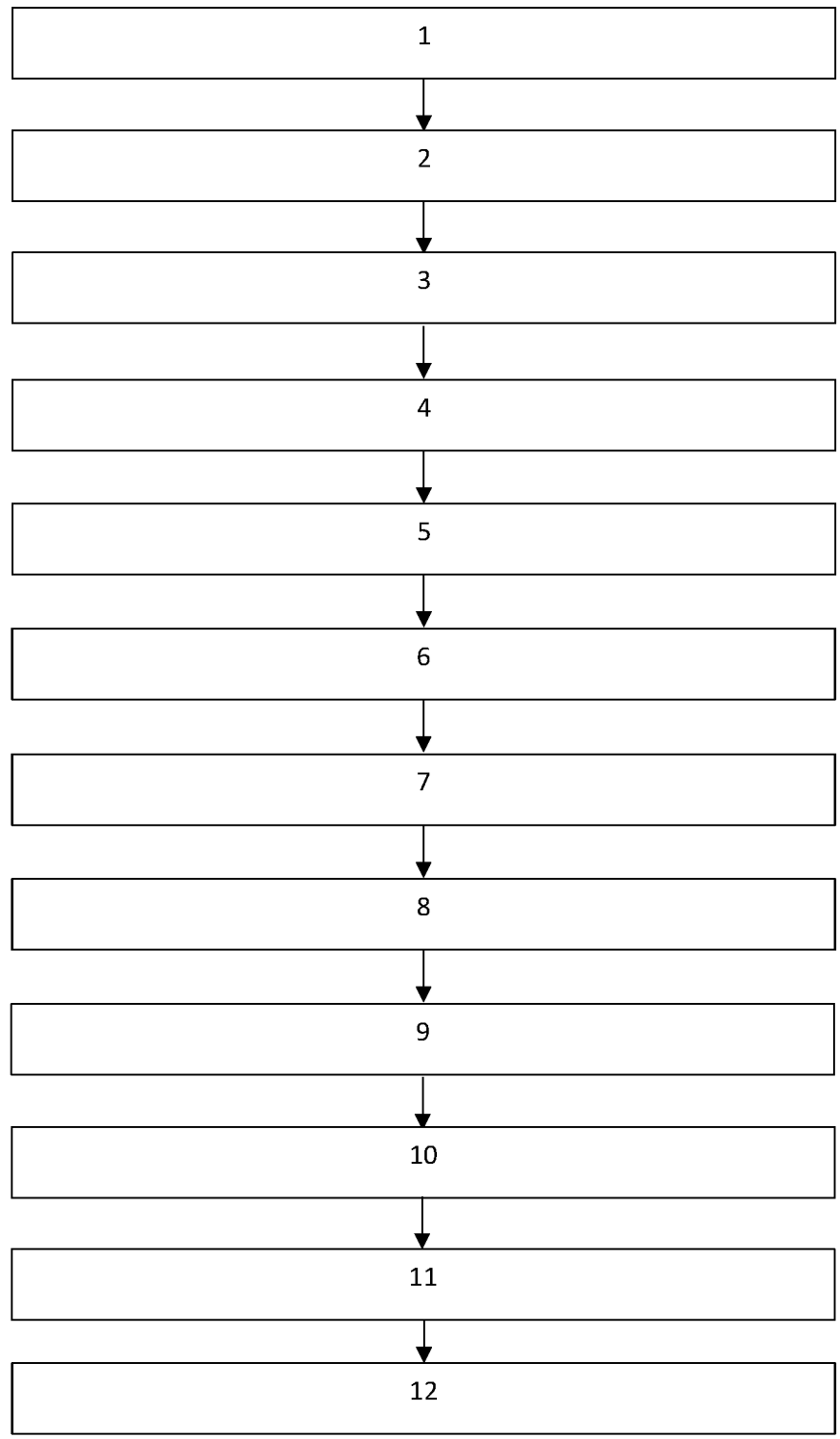

METHOD OF INDUSTRIAL EXTRACTION OF ALGINATES FROM BROWN SEAWEED OF THE FAMILY SARGASSACEAE OF THE ORDER FUCALES

FIELD OF THE INVENTION

This invention relates to biotechnology the industrial production of alginates having applications in the food industry, cosmetology, and medicine.

BACKGROUND OF THE INVENTION

Brown seaweeds have been a major natural resource for alginate extraction since industrial production began in 1929 in Calif., USA, and, shortly thereafter, since 1939 in Europe and Japan, and, most recently, since the 1980s in China.

Although there are more than 2,000 species of brown seaweeds (class Phaeophyceae), only a few species from the divisions *Laminariales* and *Fucales* (*laminaria* and *fucus*) are used worldwide as raw materials for alginate production. These are, in particular, *Macrocystis pyrifera, Laminaria hyperborea, L. digitata, Saccharina japonica*, the group of species *Lessonia nigrescens, L. trabeculata, Ecklonia arborea* and *Ecklonia radiata* and the *fucus Durvillaea potatorum* and *Ascophyllum nodosum*. Alginophytes, in addition to containing large amounts of alginate, form dense thickets on shallow rocky shores. These seaweed species are distributed in cold temperate waters throughout the world, and as photosynthetic organisms, they are restricted to habitats with appropriate light levels, mostly from the intertidal zone to a depth of 50 m in the sublittoral zone.

The main alginophytes collected worldwide are Lessonia and Laminaria, accounting for 65% of total production, followed by Saccharina with 21% of total production. It is worth highlighting the sharp decrease in the collection of Macrocystis and Ascophyllum, which used to be an important raw material for the production of alginates. This process may also affect the populations of the main alginophytes, Lessonia and Laminaria.

Algae of the family Sargassaceae, which grow in warmer waters, are used only sporadically for alginate production when major industrial sources are not available because their alginate is generally rated as "borderline" quality polysaccharides.

Traditionally, alginophytes are still harvested by hand in most countries. Industrial methods of aquaculture cultivation of traditional alginophytes are still under development and raise concerns about their negative impact on coastal ecosystems.

Polysaccharides are important components of brown algae, including alginate, fucoidan, laminaran, etc. Alginates, commonly referred to as sodium alginate, comprise a linear copolymer with polysaccharide homopolymer blocks of (1-4)-linked β-D-mannuronate (M) and α-L-guluronate (G) residues. There are three types of their segmental chain structure: M blocks of continuous M units, G blocks of continuous G units, and MG block formed by alternately linked G and M units. Alginates are also the most representative class of chemical products from algae. For ease of storage and use, alginates are usually converted to sodium alginate as the final product during their extraction from brown algae. As a sodium salt of an anionic polysaccharide (alginic acid), sodium alginate has a very wide range of industrial applications due to its inherent physical and chemical properties.

Alginates are widely used due to their rheological properties as well as their biocompatibility, biodegradability and lack of toxicity. The ratio of the three types of blocks—MM, GG and MG—determines the physical properties of alginates. Alginates with high G have higher gel-forming properties, while blocks with high M have higher viscosity. Evaluating the M/G ratio is also fundamental—for alginates with a high M/G ratio, alginates provide hard, nonelastic gels, while alginates with a low M/G ratio produce soft, elastic gels. Alginates with high levels of guluronic acid in relation to mannuronic acid are most in demand. Alginates contained in brown seaweeds of the family Sargassaceae of the order Fucales have this level. However, so far no optimal industrial technology has been developed for extraction of quality alginates from brown seaweeds of the family Sargassaceae of the order Fucales.

Alginic acid and its salts are effective enterosorbents that can bind and excrete heavy metals and radionuclides, protect against external and internal radiation, regulate the liver and pancreas, stop inflammatory processes in gastrointestinal system, accelerate wound healing, lower blood cholesterol levels, normalize blood sugar levels, normalize the immune system, and normalize blood parameters. The ion-exchange properties of alginic acid and its salts are considered the most important from a medical point of view. As a result of studies on the ion-exchange capacity of alginic acid, metals sorbability on it were arranged in a general series, which showed that, unlike other sorbents that have a high stability constant with calcium, alginic acid can bind heavy metals and their radioisotopes in the human body without affecting the calcium metabolism. This is the reason for the wide use of alginates in the production of functional foods.

In cosmetology, alginates are used to create a line of medicinal cosmetics, adapted to a particular consumer and combining the cleansing, nourishing and protective functions. It can be used both as a component of the external application and as a separate hydrogel for subcutaneous application. Hydrogels for subcutaneous application can contain BAS (biologically active substances), drugs and live cell cultures.

In pharmacology alginates are used as a base:
for cellular material in 3D bioprinters (transplantology);
in passive and active systems for transdermal and transbuccal delivery of complex high molecular weight drugs (for example, insulin and other proteins, factors for transgenic therapy);
for immobilization of cellular material (bacterial, yeast, plant and animal cell cultures) for use in the food, pharmaceutical and chemical industries;
creation of biodegradable biopolymers for use in orthopedics;
creation of a bioplatform for oral delivery of biotransformation-sensitive drugs (such as insulin) through the gastrointestinal system directly into the lymphatic and circulatory system bypassing the liver and pancreas;
in the creation of a bioplatform for encapsulation of biodegradable glucose microsensors and other biochemical markers (for continuous real-time monitoring) of transdermal and subcutaneous type;
for cell/tissue protection in cryopreservation.

Disadvantages of the prior art include:
1. The methods for extraction of alginates from brown seaweed of the Sargassaceae family (Sargassaceae, order Fucales), if existent, do not result in a final product of sufficient quality for even the lowest grade necessary (i.e., food).

2. Prior art methods cannot be scaled due to the complexity of the process and, in turn, high cost and low profitability.

The present invention addresses these disadvantages and provides further improvements to both the method of extraction and the final extracted product.

SUMMARY OF THE INVENTION

The essence of the invention is as follows. A method of industrial extraction of alginates from brown seaweeds of family Sargassaceae of order Fucales, using, as an example, Cystoseira barbata, comprises: preparation of raw materials, crushing the algae, pressure boiling the algae, mixing the boiled algae with water, purification of the diluted algal mass, extraction of alginic acid, washing of alginic acid, dehydration of alginic acid, treatment of alginic acid with sodium hydrogen carbonate, clarification of the sodium alginate solution, precipitation of sodium alginate, and drying of sodium alginate.

Advantages of the invention include: allowing for a new group of alginophytes, the family Sargassaceae of the order Fucales, to be widely used for industrial production; allowing for an increase in the yield of alginates compared to other widely used alginophytes with the same production costs; allowing for alginates to be cleaned of heavy metals, proteins, polyphenols, and endotoxins during the production process; the extracted alginates of the invention are characterized by the highest content of guluronic acid as compared to industrial alginates extracted from basic alginophytes; the natural three-dimensional structure of the polysaccharide is preserved; and allowing for technological control of the viscosity of the final product.

BRIEF DESCRIPTION OF THE DRAWINGS

The invention is illustrated by the following diagrams.

FIG. 1 shows a flowchart of the extraction process according to the present invention.

DETAILED DESCRIPTION OF THE PREFERRED EMBODIMENT

The following 12 stages are provided as a general description of the technological extraction process according to the present invention:

1) Raw material preparation 1. Raw and fresh algae is soaked in a solution comprising purified water, 0.1-10% of table salt (i.e., sodium chloride), and 0.1-5% of aqueous formaldehyde solution, for a period from 1 to 30 days.

2) Pulverization of algae 2. Algae are washed with clean water and crushed to the size not more than 10 cm.

3) Pressure cooking of algae 3. Algae pressure boiling is carried out under pressure of 1-1.5 atm. at temperature 100-110° C., for 0.5-12 hours in 0.5-10% solution of sodium hydrocarbonate, based on purified water. The ratio of algae to solution is between 1:1 and 1:20.

4) Mixing the boiled algae with water 4. The boiled mass of algae is mixed with purified water to a ratio of 1:20-1:300 and stirred vigorously for 1-10 hours at 20-60 degrees C.

5) Purification of the diluted algae mass 5. Preliminary purification of algal mass is carried out by settling for 1-24 hours. After sedimentation, the solution is successively cleaned by flow separation and pressure microfiltration methods from rough and fine suspension, such that particles having a size of 10-30 microns are filtered out.

6) Extraction of alginic acid 6. Before and after adding sulfuric acid to the purified solution, the mixture is mechanically stirred. 70% sulfuric acid is added to achieve a pH of 1.5-4.0. After stirring is complete, the alginic acid floats up to the surface, taking about 0.5 to 2 hours, depending on the amount of alginic acid produced.

7) Washing of Alginic Acid 7. Alginic acid is collected and thoroughly washed with purified water to a pH of 4.0-5.5.

8) Dehydration of alginic acid 8. Dehydration of alginic acid is carried out under its own weight using a dense cloth for 1-12 hours. The volume of alginic acid should decrease by 2-5 times the original volume. Water content in the final product is between 50-90%. For acceleration of dehydration of alginic acid, a flow separator or a self-discharging centrifuge can be used.

9) Treatment of alginic acid with sodium hydrogen carbonate 9. Dehydrated alginic acid is mixed with an estimated amount of sodium bicarbonate (i.e., baking soda) to achieve a pH of 5.0-7.5. Stirring is carried out for 0.1-1.0 hour until a homogeneous consistency of sodium alginate gel without lumps is obtained (homogeneous in composition).

10) Clarification of sodium alginate solution 10. Sodium hypochlorite is poured into the sodium alginate solution with active stirring until the active chlorine content is at 0.2-6.0 g/l. Clarification time is between 4-180 minutes. The process is controlled visually—the fibers of precipitated sodium alginate should turn a homogeneous white color. The pH of the final product is controlled to remain between 5.0 and 7.5.

11) Sodium alginate precipitation 11. Into the clarified solution of sodium alginate, ethyl alcohol (50-95% vol.) is poured with active stirring. After forming a fibrous mass of sodium alginate, it is allowed to stand in this solution for 30-60 minutes for improved coagulation. After complete precipitation of sodium alginate, it is separated from the solution and washed twice in 50-95% vol. ethyl alcohol. After washing, the sodium alginate is squeezed to achieve a residual moisture content of 20-60%.

12) Drying of sodium alginate 12. The pressed sodium alginate is spread out on dry and clean trays to form a 1-2 cm layer. The sodium alginate is spread with local and general ventilation on. The trays are placed in a drying cabinet with forced ventilation. Drying temperature is 35-60 degrees C. The product is dried for 2-12 hours, stirring occasionally until the final humidity does not exceed 15%. Dried sodium alginate is redissolved in purified water to a concentration of 1-5%. The resulting solution is dried in a vacuum spray dryer at a temperature not exceeding 60 degrees C.

Advantageous characteristics of the method and product of the invention include the following:

1. The raw material is fresh brown algae of the family, Sargassaceae (Sargassaceae), of the order, Fucales. Only fresh algae are used as the raw material. The raw material initially collected for extraction can also be frozen, at −10 degrees C., and stored in this form for up to two years with no loss of quality in the raw material or the final extracted product.

2. Purification of the final product from heavy metals, proteins, and polyphenols, resulting from the steps carried out in stages 1, 3, 5, 6, 7, 8, 10 and 11.

3. Preservation of the natural 3-D structure of the polysaccharide, resulting from the steps carried out in stages 1 and 3.

4. Preservation of the natural and initially high content of L-guluronic acid in alginic acid during the entire technological process. The ratio of D-mannuronic to L-guluronic acid remains 0.05-0.6 throughout the process and within the resulting product.

5. Reduction of endotoxin levels in the extracted product to 100 EU/g. Endotoxin levels are reduced to 100 EU/g by using aqueous formaldehyde solution, alkaline hydrolysis at high temperature, acid hydrolysis, oxidation with sodium hypochlorite, and extraction with ethyl alcohol.

6. The ability to vary the viscosity of the resulting product, ranging from 50-1,500 mPa.s (cP), based on the variation of technological parameters at stages 1, 3, 6, and 10.

7. Dry weight of sargassum algae is 20% of the raw weight. The yield of sodium alginate is 20%-40% of the dry weight (e.g., 40-80 kg yield per 1 ton of raw algae).

Detailed examples of the extraction method of the present invention are provided hereinbelow.

Example 1.

1. We took 100 kg of raw brown algae of Cystoseira barbata species and poured 200 L of water in which we dissolved 2 kg of sodium chloride and 1 L of 40% aqueous formaldehyde solution and incubated for three days.

2. Raw algae, after conservation, was washed in running water for 30 minutes. After washing, we let the water drain off and crushed the algae to the size of 0.5-1 cm.

3. The crushed algae were loaded into the extractor, poured into 3% sodium bicarbonate solution in the ratio of 1:5 and boiled under pressure of 1 atmosphere at t=100° C. for 2 hours.

4. The boiled mass was mixed with purified water to a ratio of 1:30 and extraction was carried out for 1 hour at t=20° C. with active stirring.

5. After extraction the obtained solution was allowed to stand for 1 hour. Then it was purified by flow separation and pressure microfiltration from coarse and fine suspended solids to remove undissolved particles sized between 10-30 microns.

6. Concentrated sulfuric acid (density 1.8) was added based on the final pH of the solution of 1.5. Before adding and after adding the acid, while diluting the settled solution to the final hydromodule, the solution was intensively mechanically mixed. After 30 minutes, alginic acid floated to the surface of the solution and had thickened.

7. The alginic acid was separated and washed of excess acid to the pH of the wash water of 4-5.5.

8. Dehydration of alginic acid was performed under its own weight using a dense cloth for 1 hour. The volume of alginic acid should decrease by a factor of 2. Water content in the final product was 60%. For acceleration of alginic acid dehydration, a flow separator or a self-draining centrifuge can be used.

9. Sodium hydrogen carbonate was added to alginic acid and actively stirred to a homogeneous mass for 10 minutes in a mixer until pH=5.0-7.5.

10. Sodium hypochlorite was poured into sodium alginate solution with active stirring until active chlorine content was 0.3 g/L. Time of clarification was 15 minutes. The process was controlled visually.

11. Ethyl alcohol (70% vol.) was poured into clarified sodium alginate solution under active stirring. After forming a fibrous mass of sodium alginate, it was allowed to stand in this solution for 30 minutes for better coagulation. After complete precipitation of sodium alginate, it was separated from the solution and washed twice in 70% vol. ethyl alcohol. After washing, sodium alginate was squeezed to a residual moisture content of 40%.

12. The squeezed sodium alginate was spread on dry and clean trays with a layer of 1-2 cm. The sodium alginate was spread with local and general ventilation turned on. The trays were placed in a drying cabinet with forced ventilation. Drying temperature was 50° C.

The product was dried for 3 hours, stirring occasionally until the final moisture content did not exceed 15%. The dried sodium alginate was redissolved in purified water to a concentration of 2%. The obtained solution was dried in a vacuum spray dryer at a temperature not exceeding 60° C.

The yield of the final product was 5.2 kg.

Example 2.

1. We took 100 kg of raw brown algae of Cystoseira barbata type and poured 200 L of water in which 10 kg of sodium chloride and 5 L of 40% aqueous formaldehyde solution were dissolved and allowed to stand for 3 days.

2. Raw algae, after conservation, was washed in running water for 30 minutes. After washing, we let the water drain off and crushed algae to the size of 0.5-1 cm.

3. Crushed algae were loaded into an extractor, poured with 6% sodium bicarbonate solution in a 1:5 ratio and boiled under 1.25 atmosphere pressure at t=105° C. for 1 hour.

4. The boiled mass was mixed with purified water to a ratio of 1:60 and extraction was carried out for 2 hours at t=30° C. with active stirring.

5. After extraction the obtained solution was allowed to stand for 2 hours. Then it was purified by flow separation and pressure microfiltration from the coarse and fine suspended solids to remove undissolved particles sized 10-30 microns.

6. Concentrated sulfuric acid (density 1.8) was added at a final pH of 2.5. Before adding and after adding the acid, while diluting the settled solution to the final hydromodule, the solution was intensively mechanically mixed. After 30 minutes, alginic acid floated to the surface of the solution and had thickened.

7. The alginic acid was separated and washed of excess acid to the pH of the wash water of 4-5.5.

8. Dehydration of alginic acid was performed under its own weight using a dense cloth for 2 hours. The volume of alginic acid should decrease by a factor of 2. Water content in the final product is 50%. A flow separator or a self-draining centrifuge can be used to speed up the dehydration of alginic acid.

9. Sodium hydrogen carbonate was added to the alginic acid and actively stirred to a homogeneous mass for 20 minutes in a mixer until pH=5.-7.5.

10. Sodium hypochlorite was poured into sodium alginate solution with active stirring until active chlorine content was 1.0 g/l. Time of clarification was 5 minutes. The process was controlled visually.

11. Ethyl alcohol (70% vol.) was poured into clarified sodium alginate solution with active stirring. After formation of fibrous mass of sodium alginate, it was allowed to stand in this solution for 40 minutes for better coagulation. After complete precipitation of sodium alginate, it was separated from the solution and washed twice in 80% vol. ethyl alcohol. After washing sodium alginate was squeezed to a residual moisture content of 30%.

12. The squeezed sodium alginate was spread on dry and clean trays with a layer of 1-2 cm. The sodium alginate was spread with local and general ventilation turned on. The trays were placed in a drying cabinet with forced ventilation. Drying temperature was 40° C. The product was dried for 5 hours, stirring periodically until the final moisture content did not exceed 15%. Dried sodium alginate was redissolved in purified water to a concentration of 3%. The obtained solution was dried in a vacuum spray dryer at a temperature not exceeding 60° C.

The yield of the final product was 6.8 kg.

Example 3.

1. We took 100 kg of raw brown algae of Cystoseira barbata type and poured 200 L of water in which 5 kg of sodium chloride and 2 L of 40% aqueous formaldehyde solution were dissolved and incubated for 30 days.

2. Raw algae, after conservation, was washed in running water for 30 minutes. After washing, we let the water drain off and ground the algae to the size of 0.5-1 cm.

3. Shredded algae were loaded into the extractor, poured into 3% sodium bicarbonate solution in the ratio of 1:5 and boiled under pressure of 1.5 atmosphere at t=110° C. for 1 hour.

4. The boiled mass was mixed with purified water to a ratio of 1:30 and extraction was carried out for 1 hour at t=20° C. with active stirring.

5. After extraction, the obtained solution was allowed to stand for 1 hour. Then it was purified by flow separation and pressure microfiltration from coarse and fine suspended solids to remove undissolved particles sized 10-30 microns.

6. Concentrated sulfuric acid (density 1.8) was added based on the final pH of the solution of 1.5. Before adding and after adding the acid, while diluting the settled solution to the final hydromodule, the solution was intensively mechanically mixed. After 30 minutes, alginic acid floated to the surface of the solution and had thickened.

7. The alginic acid was separated and washed of excess acid to the pH of the wash 8. Dehydration of alginic acid was performed under its own weight using a dense cloth for 2 hours. The volume of alginic acid should decrease by a factor of 2. Water content in the final product is 60%. For acceleration of alginic acid dehydration a flow separator or a self-draining centrifuge can be used.

9. Sodium hydrogen carbonate was added to alginic acid and actively stirred to a homogeneous mass for 15 minutes in a mixer until pH=5.0-7.5.

10. Sodium hypochlorite was poured into sodium alginate solution with active stirring until active chlorine content was 0.5 g/l. Time of clarification was 15 minutes. The process was controlled visually.

11. Ethyl alcohol (70% vol.) was poured into clarified sodium alginate solution under active stirring. After forming a fibrous mass of sodium alginate, it was allowed to stand in this solution for 30 minutes for better coagulation. After complete precipitation of sodium alginate, it was separated from the solution and washed twice in 70% vol. ethyl alcohol. After washing sodium alginate was squeezed to a residual moisture content of 30%.

12. The squeezed sodium alginate was spread on dry and clean trays with a layer of 1-2 cm. The sodium alginate was spread with local and general ventilation turned on. The trays were placed in a drying cabinet with forced ventilation. Drying temperature was 60° C. The product was dried for 2 hours, stirring occasionally until the final moisture content did not exceed 15%. The dried sodium alginate was redissolved in purified water to a concentration of 2%. The obtained solution was dried in a vacuum spray dryer at a temperature not exceeding 60° C.

The yield of the final product was 7.1 kg.

Example 4.

1. We took 100 kg of raw brown algae of Cystoseira barbata species and poured 200 L of water in which we dissolved 2 kg of sodium chloride and 1 L of 40% aqueous formaldehyde solution and incubated for three days.

2. Raw algae, after conservation, was washed in running water for 30 minutes. After washing, we let the water drain off and crushed the algae to the size of 0.5-1 cm.

3. Crushed algae were loaded into the extractor, poured into 3% sodium bicarbonate solution in the ratio of 1:5 and boiled under pressure of 1.5 atmosphere at t=110° C. for 1 hour.

4. The boiled mass was mixed with purified water to a ratio of 1:30 and extraction was carried out for 1 hour at t=40° C. with active stirring.

5. After extraction the obtained solution was allowed to stand for 3 hours. Then it was purified by flow separation and pressure microfiltration from coarse and fine suspended solids to remove undissolved particles of 10-30 microns in size.

6. Concentrated sulfuric acid (density 1.8) was added based on the final pH of the solution of 2.5. Before adding and after adding the acid, while diluting the settled solution to the final hydromodule, the solution was intensively mechanically mixed. After 30 minutes, alginic acid floated to the surface of the solution and had thickened.

7. The alginic acid was separated and washed of excess acid to the pH of the wash water of 4-5.5.

8. Dehydration of alginic acid was performed under its own weight using a dense cloth for 2 hours. The volume of alginic acid should decrease by a factor of 2. Water content in the final product was 50%. A flow separator or a self-draining centrifuge can be used to speed up the dehydration of alginic acid.

9. Sodium hydrogen carbonate was added to alginic acid and actively stirred to a homogeneous mass for 20 minutes in a mixer until pH=5.0-7.5.

10. Sodium hypochlorite was poured into sodium alginate solution with active stirring until active chlorine content was 0.8 g/l. Time of clarification was 10 minutes. The process was controlled visually.

11. Ethyl alcohol (70% vol.) was poured into clarified sodium alginate solution under active stirring. After forming a fibrous mass of sodium alginate, it was allowed to stand in this solution for 60 minutes for better coagulation. After complete precipitation of sodium alginate, it was separated from the solution and washed twice in 70% vol. ethyl alcohol. After washing, sodium alginate was squeezed to a residual moisture content of 40%.

12. The squeezed sodium alginate was spread on dry and clean trays with a layer of 1-2 cm. The sodium alginate was spread with local and general ventilation turned on. The trays were placed in a drying cabinet with forced ventilation. Drying temperature was 60° C. The product was dried for 2 hours, stirring occasionally until the final moisture content did not exceed 15%. The dried sodium alginate was redissolved in purified water to a concentration of 1%. The obtained solution was dried in a vacuum spray dryer at a temperature not exceeding 60° C.

The yield of the final product was 7.9 kg.

The product obtained by the present invention has the following characteristics:

1. Viscosity (1% solution): 50-1,500 mPa.s (cP)
2. pH (1% solution): 5.0-7.5
3. Losses at drying: not more than 13%.
4. Particle size: no less than 98% of 355 microns, not less than 80% after 250 microns.
5. (a) Appearance: creamy to light brown powder.
5. (b) Color of powder: not less than 48.
6. Ash (in terms of dry matter): 18-27%.

7. Lead (Pb): max 5 mg/kg.
8. Arsenic (As): max 3 mg/kg.
9. Copper (Cu): max 10 mg/kg.
10. Zinc (Zn): max 10 mg/kg.
11. Mercury (Hg): max 0.5 mg/kg.
12. Cadmium (Cd): max 0.5 mg/kg
13. Microbiological parameters:

(a) Bacteria: no more than 5,000 CFU/g (Total number of viable mesophilic aerobic bacteria).

(b) Yeast and mold: no more than 300 CFU/g.

(c) Coliforms: negative according to MPN.

(d) Escherichia coli: none in 25 g.

(e) Salmonella: none in 25 g.

In relation to the prior art, the method and product of the present invention are an improvement at least due to the following factors:

1. Instead of treatment with, e.g., acid or calcium chloride, aqueous formaldehyde and sodium chloride are utilized. Aqueous formaldehyde and sodium chloride are utilized in treating the algae in an initial required step of the extraction process. The result of such a treatment is many-fold, including: (a) the algae is better preserved from the treatment; (b) aqueous formaldehyde, in the presence of sodium chloride, acts as a cross-linking agent for the alginic acids, thereby increasing the length of the polymer chain; (c) aqueous formaldehyde, in the presence of sodium chloride, further acts as a cross-linking agent for phenolic compounds, thereby increasing their length and reducing their solubility; and (d) sodium chloride promotes the replacement of divalent atoms in the carboxylic group of alginic acids with sodium, thereby increasing the yield of total alginates from the raw material.

2. To further increase the extraction yield, the algae is processed (i.e., boiled, cooked) at high pressure (i.e., 1-1.5 atm) and high temperature (i.e., greater than 100° C.).

3. Extraction is performed only with sodium hydrogen carbonate, which partially breaks down into carbon dioxide and sodium carbonate when boiling under said high pressure and high temperature. This further increases the yield and prevents alkaline hydrolysis of the alginates.

4. Sulfuric acid only, and not hydrochloric acid, is used for the extraction of alginic acid, which better facilitates the dissolving of ballasted acidic polysaccharides that would typically contaminate the alginates.

5. The sodium hypochlorite clarification process is combined with sodium alginate precipitation with ethyl alcohol, which protects the biopolymer from oxidation via active chlorine and, simultaneously, facilitates the removal of oxidized forms of various pigments and endotoxins from the extracted product.

6. Only fresh algae (i.e., not dried algae) is used as the raw material, which may be frozen for preservation purposes, thereafter being thawed prior to processing.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for producing alginate, comprising:
soaking raw algae in a solution comprising purified water, 0.1-10% sodium chloride, and 0.1-5% aqueous formaldehyde for 1 to 30 days,
washing said raw algae with clean water,
crushing said raw algae to a size not greater than 10 cm,
boiling said raw algae under a pressure of 1-1.5 atm and at a temperature of 100-110° C., for 0.5-12 hours, in an aqueous solution of 0.5-10% sodium hydrocarbonate, the ratio of the raw algae to the aqueous solution ranging between 1:1 and 1:20,
mixing said raw algae with water to form a diluted algae mass having an algae-to-water ratio of 1:20-1:300 and stirring said raw algae with water for 1-10 hours at 20-60° C.,
purifying said diluted algae mass to form a purified solution,
adding sulfuric acid to said purified solution, while being mechanically stirred, to achieve a pH of 1.5-4.0, thereby precipitating alginic acid,
collecting and washing said alginic acid with purified water to a pH of 4.0-5.5,
dehydrating said alginic acid,
mixing sodium hydrogen carbonate with said alginic acid to achieve a mixture pH of 5.0-7.5, and stirring said mixture to form a homogeneous sodium alginate gel,
adding sodium hypochlorite to the homogenous sodium alginate gel, and actively stirring until an active chlorine content reaches 0.2-6.0 g/l,
adding ethyl alcohol (50-95% vol.) to said homogeneous sodium alginate gel to precipitate a fibrous mass of sodium alginate, washing said fibrous mass of sodium alginate, and pressing said fibrous mass, and
drying said fibrous mass of sodium alginate.

2. The method of claim 1, wherein said purifying further comprises allowing settling for 1-24 hours.

3. The method of claim 2, wherein said purifying, after said settling, further comprises cleaning said purified solution via flow separation and pressure microfiltration methods such that particles having a size of 10-30 microns are filtered out.

4. The method of claim 1, wherein said dehydrating occurs under an own weight of said alginic acid for 1-12 hours.

5. The method of claim 1, wherein said dehydrating is accelerated via use of a flow separator.

6. The method of claim 1, wherein said dehydrating is accelerated via use of a self-discharging centrifuge.

7. The method of claim 1, wherein said adding sodium hypochlorite to the homogenous sodium alginate gel and actively stirring is controlled by visually screening for a homogeneous white color.

8. The method of claim 1, wherein said drying of said fibrous mass of sodium alginate comprises temperatures between 35-60° C.

9. The method of claim 1, further comprising:
   redissolving said dry sodium alginate in purified water to a concentration of 1-5% sodium alginate, and
   drying said 1-5% sodium alginate in a vacuum spray dryer at a temperature not exceeding 60° C.

10. The method of claim 1, comprising freezing said raw algae prior to soaking.

11. The method of claim 1, wherein said raw algae is Sargassaceae.

12. The method of claim 11, wherein said raw algae is Cystoseira barbata.

* * * * *